United States Patent [19]

Sanford et al.

[11] Patent Number: 4,599,560
[45] Date of Patent: Jul. 8, 1986

[54] AC EXCITED TRANSDUCER HAVING STABILIZED PHASE SENSITIVE DEMODULATOR CIRCUIT

[75] Inventors: Norman R. Sanford, Piqua; Gerald L. Tumbush, Dayton, both of Ohio

[73] Assignee: The Warner & Swasey Company, Cleveland, Ohio

[21] Appl. No.: 483,465

[22] Filed: Apr. 11, 1983

[51] Int. Cl.⁴ ............... G01B 7/14; G05B 1/06; G08C 19/06
[52] U.S. Cl. ............... 324/207; 340/870.36; 318/657; 364/560
[58] Field of Search ............... 324/207, 208, 233; 340/870.32, 870.35, 870.36; 318/653, 656, 657; 364/560, 561, 562, 563

[56] References Cited

U.S. PATENT DOCUMENTS

| | | | |
|---|---|---|---|
| 4,134,065 | 1/1979 | Bauer et al. | 324/208 |
| 4,140,998 | 2/1979 | Bettle | 340/870.36 |
| 4,207,520 | 6/1980 | Flora et al. | 324/233 |
| 4,322,683 | 3/1982 | Vieira et al. | 324/233 |
| 4,450,443 | 5/1984 | Dolland | 324/208 |

OTHER PUBLICATIONS

"Transducer Signal Conditioners" December, 1971, *Technical Bulletin 7001* pp. 1-4 by Schaevitz Engineering.
"Signal Conditioning Stops Transducer Errors" Feb. 18, 1981 EDN pp. 147, 150 by Yishay Netzer-Honeywell Electro Optics.
"Multifunction chip plays many parts in analog design" 4/7/81 Electronics pp. 121-129 by David Gilooly & Paul Henneuse.

*Primary Examiner*—Ernest F. Karlsen
*Assistant Examiner*—Walter E. Snow
*Attorney, Agent, or Firm*—Howard G. Massung; Thomas K. Ziegler; Raymond J. Eifler

[57] ABSTRACT

A signal conditioning circuit (30) using an oscillator (32) which feeds a counter (34) whose output addresses a programmable memory (42). The output of the programmable memory (42) provides a selected processed signal which is used for excitation of a transducer (12). The processed signals can have various phase shifts, frequencies, or amplitudes. The transducer (12) has a mechanical input (14) and provides a modulated signal output which is a function of the mechanical input. The output of the transducer (12) is fed to a phase sensitive demodulator (36). Demodulator (36) provides an output signal in response to the signal from transducer (12) and an appropriate demodulator drive signal. The output signal from demodulator (36) is indicative of the mechanical input to transducer (12). Averaging means (40) is connected to the output of the demodulator (36) to provide a DC signal which is proportional to the mechanical input to transducer (12).

13 Claims, 7 Drawing Figures

AC EXCITED TRANSDUCER HAVING STABILIZED PHASE SENSITIVE DEMODULATOR CIRCUIT

BACKGROUND OF THE INVENTION

1. Technical Field

This invention relates to metrology instruments and more particularly to an improved control and phase sensitive demodulator circuit used with an AC excited transducer.

2. Background Art

Transducers for sensing movement which require AC excitation and provide a modulated output, such as a linear variable differential transformer or LVDT, are well known in the prior art. An LVDT includes a primary winding, on an insulating spool, which is excited by a constant frequency and amplitude AC voltage. A pair of secondary coils are wound on the spool on each side of and in close proximity to the primary coil. The pair of secondary coils are connected in series opposition so that the two voltages in the secondary circuit are opposite in phase. An elongated movable core is positioned inside of the spool and provides a path for magnetic flux linking the coils. With the secondary coils connected in series opposition and with the moveable core in a null position theoretically there is zero output on the secondary. When the core is moved from the null position, voltage induced in the secondary coil towards which the core is moved increases, while voltage induced in the other secondary coil decreases. The LVDT thus produces a differential voltage which varies linearly with the core displacement from the null position. Motion of the core in the opposite direction produces a similar linear voltage but of an opposite phase.

The movable core can be connected to various devices for indicating changes in parameters such as force, weight, pressure, distance or acceleration. By mechanical connections the various devices cause movement of the core which is indicative of the parameter being measured. Due to its small core mass and low friction the LVDT can accurately follow rapid changes in displacement. The output of the AC excited LVDT transducer is a modulated wave whose envelope accurately portrays the wave form, frequency and amplitudes, of the core movement. The transducer output is demodulated to provide an output corresponding to core movement.

A synchronous demodulator can be used to extract the transducer core position information from the carrier. LVDT error signals result from small quadrature components and other nonideal transformer properties. With the core in a null position the LVDT still has an error signal output. At low LVDT signal levels the error signal is relatively large. By synchronous demodulation all signals not synchronized to the LVDT excitation frequency are averaged to zero. In the April 7, 1981 issue of Electronics pages 121 thru 129, which is herein incorporated by reference, the use of a GAP-01 for synchronous demodulation is described.

There is normally a phase shift between the output of the LVDT and the input excitation. To compensate for this phase shift in prior art signal conditioners a phase shift circuit is provided in parallel with the LVDT, between the excitation source and the demodulator. The phase shift is commonly provided by an RC circuit. An RC circuit however is limited to an ideal phase shift of 90 degrees for a single RC pair. Also the tolerence on inexpensive capacitors is typically five to twenty percent, thus effecting the accuracy of the phase shift. Resistor and capacitor values also change with temperature and this will further effect phase shift accuracy. When a fixed phase shift network is used for a family of LVDTs, each of which has its own specific phase shift, there is a loss of sensitivity due to nonideal matching of the secondary phase with the demodulator phase. While this effect may be small and may not effect linearity in itself, it is disadvantageous in that higher amplifier gain is required to compensate for the lost sensitivity. Mismatch also tends to exaggerate the errors as the phase shift further changes with respect to temperature, time or excitation frequency. The higher amplifier gain can then cause higher drift within the electronics system.

Another approach to the problem is to design an LVDT with a zero degree phase shift at the operating frequency. Designing an LVDT with zero degree phase shift, however, can add significant cost to the manufacturing process and often is difficult to maintain for all different ranges of a family of LVDTs. Ignoring the existence of phase shift can cause linearity problems as the frequency, phase and harmonics of the system change with temperature and time.

Existing LVDT phase sensitive demodulators often suffer performance problems due to several sources such as instability of primary voltage amplitude, instability of the phase shift of the reference voltage to the demodulator, improper matching of the demodulator reference voltage phase to the phase of the secondary output signal from the LVDT, harmonics present in the primary voltage source, and instability of the excitation frequency.

DISCLOSURE OF THE INVENTION

The transducer conditioning circuit of the present invention uses a stable oscillator which feeds a counter that divides the oscillator frequency down to the transducer excitation frequency and the demodulator drive frequency. One output signal of the counter is fed directly to drive the synchronous demodulator while other output signals are fed to a phase shift circuit. The output of the phase shift circuit provides the transducer excitation. The transducer has a mechanical connection to its core which is moved in response to the parameter being measured. Movement of the core causes a modulated output from the transducer which is a function of the measurement taken. The modulated output of the transducer is fed to the demodulator which provides a DC output. The DC output of the demodulator goes thru an averaging circuit or low pass filter which removes unwanted AC components to provide a DC output signal indicative of the movement measured by the transducer. The phase shift for the input excitation voltage applied to the transducer is selected so that the phase of the transducer output signal is closely matched with the phase of the demodulator drive signal.

The phase shift can be provided from a memory, such as a ROM, PROM, or an EPROM which is programmed to provide the desired phase shift when addressed by the counter signals. Amplitude as well as phase shift can be stored in the memory. The memory can also store frequencies in integer multiples such as 5 KHZ, 10 KHZ or 20 KHZ. The memory is programmed so that the phase of the excitation voltage to the transducer is shifted to make the secondary modulated signal in phase with the demodulator drive signal. The memory output is fed to a digital analog converter, DAC, whose output feeds the transducer. The transducer can be an LVDT.

Rather than feeding the output of the memory directly to the DAC, the quality of the drive signal can be improved by having the memory feed a latch to deglitch the memory output lines. The latch output is fed to the DAC. The output of the DAC can be improved, if desired, by providing some high frequency filtering. Several sine waves can be stored in memory and the one which provides the best match with the LVDT being utilized can be selected. For example, sine waves having different phase shifts which vary in four degree increments between minus fourteen degrees and plus fourteen degrees can be stored in memory. This would require storing eight different sine waves in memory. A sine wave selector switch can be provided with the memory for selecting the properly phase shifted sine wave which is provided in response to the counter address signals. The sine wave which most closely matches the LVDT output to the demodulator can be selected. Sine waves having different amplitudes and frequencies can also be stored.

In the disclosed transducer conditioning circuit using a synchronized demodulator circuit, a crystal oscillator is used to provide for frequency stability. The counter which is fed by the crystal oscillator divides the oscillator frequency down to the demodulator frequency and provides the input address signals to the memory. The demodulator is driven by the most significant bit of the digital counter signal. The disclosed circuit provides a constant and stable phase shift. The phase shift is readily alterable, in phase or amplitude, with a different memory or by using different sections of the same memory which are programmed with another phase shift and/or amplitude. Thus a closely matched demodulator phase shift can always be obtained. Use of the memory and the digital to analog converter gives a stable amplitude for the primary excitation signal for the transducer. Use of the memory and the DAC gives a transducer primary excitation signal with little harmonic distortion. Distortion of the excitation signal can further be improved by using more bits for the counter memory and DAC or by providing additional filtering on the output of the DAC. Any phase shift from zero degrees to three hundred sixty degrees is possible and the amplitude of neither the transducer primary excitation voltage nor the demodulator reference drive voltage is affected, as would typically be the case with an RC phase shifting network.

BRIEF DESCRIPTION OF THE DRAWINGS

For a better understanding of the drawings of the invention, reference may be made to the preferred embodiment exemplary of the invention shown in the accompanying drawings in which.

BEST MODE FOR CARRYING OUT THE INVENTION

Figure 3:
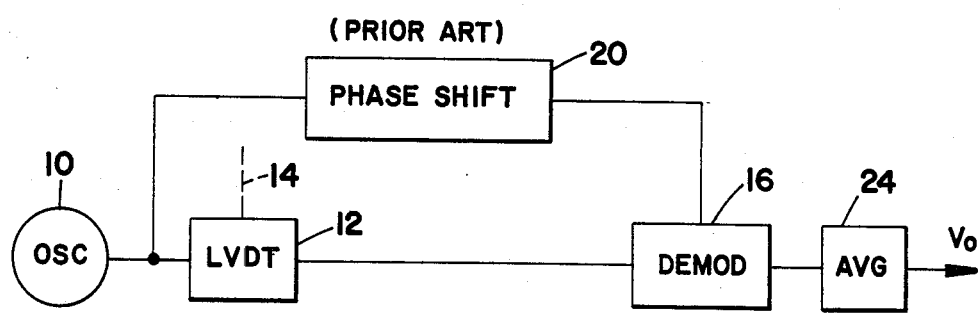
FIG. 3 is a block diagram of a prior art transducer conditioning circuit having a phase sensitive demodulator.

Referring to FIG. 3 there is shown a prior art phase sensitive demodulator circuit. Oscillator 10 provides an excitation signal to the primary of an LVDT 12. LVDT 12 has a movable low inertial ferromagnetic core connected by a mechanical connection 14 to the device whose movement is to be detected. The output from the secondary of LVDT 12 is fed to a demodulator 16. Transducers of the LVDT 12 type are driven with a primary excitation signal commonly of 5 KHz. The output of the LVDT 12 secondary is amplified and demodulated to determine physical displacement of the LVDT core with respect to an electrical null or mechanical zero position. Because LVDT 12 is a transformer there is typically a phase shift of the secondary output signal with reference to the primary winding drive or excitation signal. The modulated secondary signal is passed through a phase demodulator 16 to obtain a plus or minus dc voltage output which varies in proportion to the physical displacement of the LVDT core from the electrical null position. In order to minimize the offset caused by the quadrature component of the secondary output signal and to maximize the secondary output signal sensitivity, a phase sensitive demodulator is used. The phase of the demodulator is matched to the phase of the in phase component of the secondary output signal from LVDT 12. In the prior art this phase matching has typically been accomplished by an RC network which phase shifts the demodulator drive signal.

In the prior art circuit shown in FIG. 3 a phase shift circuit 20 is connected in parallel with LVDT 12 and provides a reference driving signal from oscillator 10 to demodulator 16. Phase shift circuit 20, which is commonly an RC circuit, is selected for a fixed phase shift to match the expected phase shift through LVDT 12. In some prior art applications the phase shift correction circuit is not used. The excitation frequency from oscillator 10, which is usually between 500 Hz and 20 Khz; is typically 5 KHz. The output of LVDT 12 is a phase and amplitude modulated output voltage which varies in accordance with the movement of the core of LVDT 12 so that the modulation envelope shows the wave form, frequency and amplitude of the motion sensed by LVDT 12, Demodulator 16 synchronously rectifies and filters the output signal from LVDT 12 to produce a varying voltage which is a direct measure of LVDT core movement. The output of demodulator 16 can be applied to a suitable averaging circuit 24, or low pass filters, to provide a clean DC output signal with most AC components removed.

Figure 1:
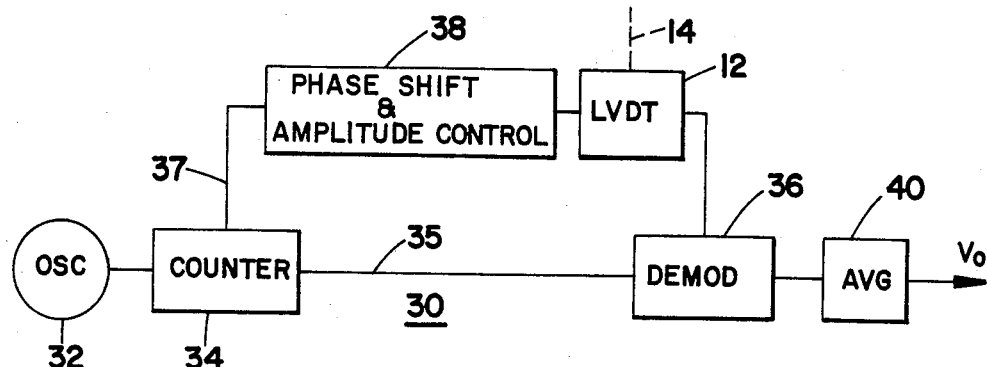
FIG. 1 is a block diagram of a transducer conditioning circuit, using a stabilized phase sensitive demodulator, constructed according to the present invention.
Figure 2:
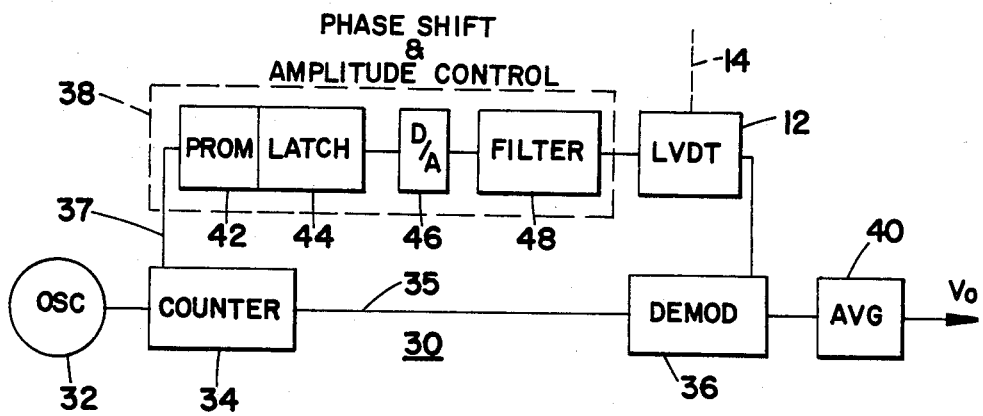
FIG. 2 is a block diagram similar to FIG. 1 showing the phase shift and amplitude control circuit for the transducer primary excitation in more detail.

Referring now to FIGS. 1 and 2 there is shown a block diagram of a transducer conditioning circuit 30 with a stabilized phase sensitive demodulator 36 according to the teaching of the present invention. A 1.28 MHz crystal oscillator 32 provides an output signal which is fed to a counter 34. Counter 34 divides the output of crystal oscillator 32 down to the demodulator drive and transducer excitation frequency of 5 KHz. One 5 KHz digital output of counter 34 is fed along line 35 as a reference signal to demodulator 36. Another output of counter 34 is fed along line 37 to a phase shift circuit 38. Phase shift and amplitude control circuit 38 conditions and shifts the phase of the counter 34 output signal to provide a primary excitation signal to LVDT 12. The primary excitation of LVDT 12 is phase shifted so that the output of LVDT 12, which is fed to demodulator 36, is in phase with the reference signal fed to demodulator 36 from counter 34 along line 35. Demodulator 36 removes the carrier from the output of the modulated signal from LVDT 12. The output of demodulator 36 is representative of movement of shaft 14 which is connected to the core in LVDT 12. The output of the demodulator 36 is fed to an averaging circuit 40 which removes unwanted AC components. The averaging circuit 40 is a low pass filter which extracts the DC component of the Fourier Series representation of the output from demodulator 36.

FIG. 2 shows in more detail a block diagram representation of phase shift and amplitude circuit 38. Phase shift and amplitude control circuit 38 includes a memory 42 such as a ROM, PROM or EPROM which is addressed by the output of counter 34 along line 37. Memory 42 when addressed by output signals from counter 34 provides a digital output of a desired processed sine wave. PROM 42 is programmed to provide a sine wave output which has a desired phase shift, amplitude and frequency. Various different phase shifts and/or amplitudes can be provided by a different PROM or by using different sections of the same PROM which are programmed to provide another phase shift and/or amplitude and/or frequency. Close matching of the demodulator phase with the output of the LVDT 12 can therefore always be achieved by selecting the proper wave shape stored in the memory of PROM 42. The output of PROM 42 is the input to a latch 44 which provides an output which does not affect PROM 42. Latch 44 feeds a digital to analog converter 46, or DAC, which converts its digital output to an analog sine wave representation. A filter 48 is provided at the output of DAC 46 to remove higher frequency components from the primary excitation signal to LVDT 12.

Figure 6:
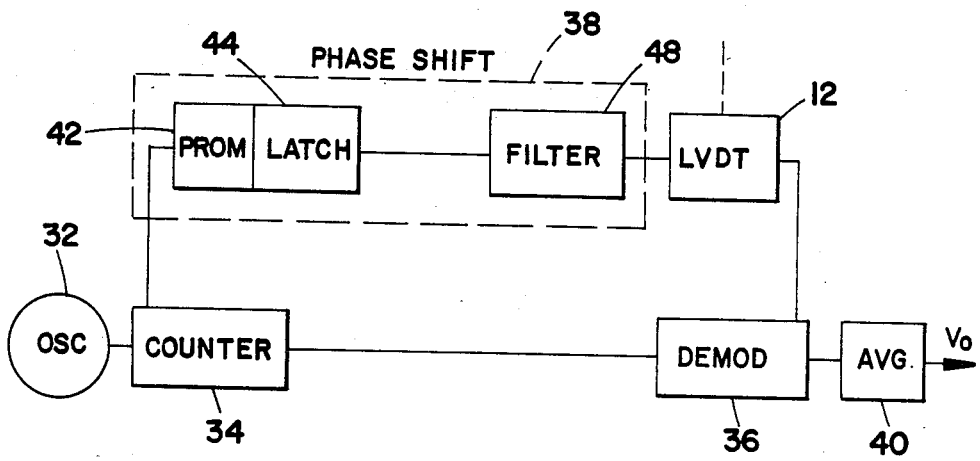

FIG. 6 shows an embodiment with the DAC 46 removed. The output of the PROM 42 could for example be a square wave and filter 48 would remove the unwanted higher frequency components.

In the disclosed design a phase shifted primary excitation signal to LVDT 12 is provided. The phase or amplitude of the signal to the primarty of LVDT 12 is changed with respect to the demodulator drive signal supplied along line 35, so that the resulting secondary output signal from LVDT 12 will be in phase with the demodulator drive signal. Thus, for example, if the secondary output from LVDT 12 lags the primary excitation by six degrees for a particular LVDT, the primary drive or excitations signal will be generated so that it leads the demodulator drive signal by six degrees.

Figure 4A:
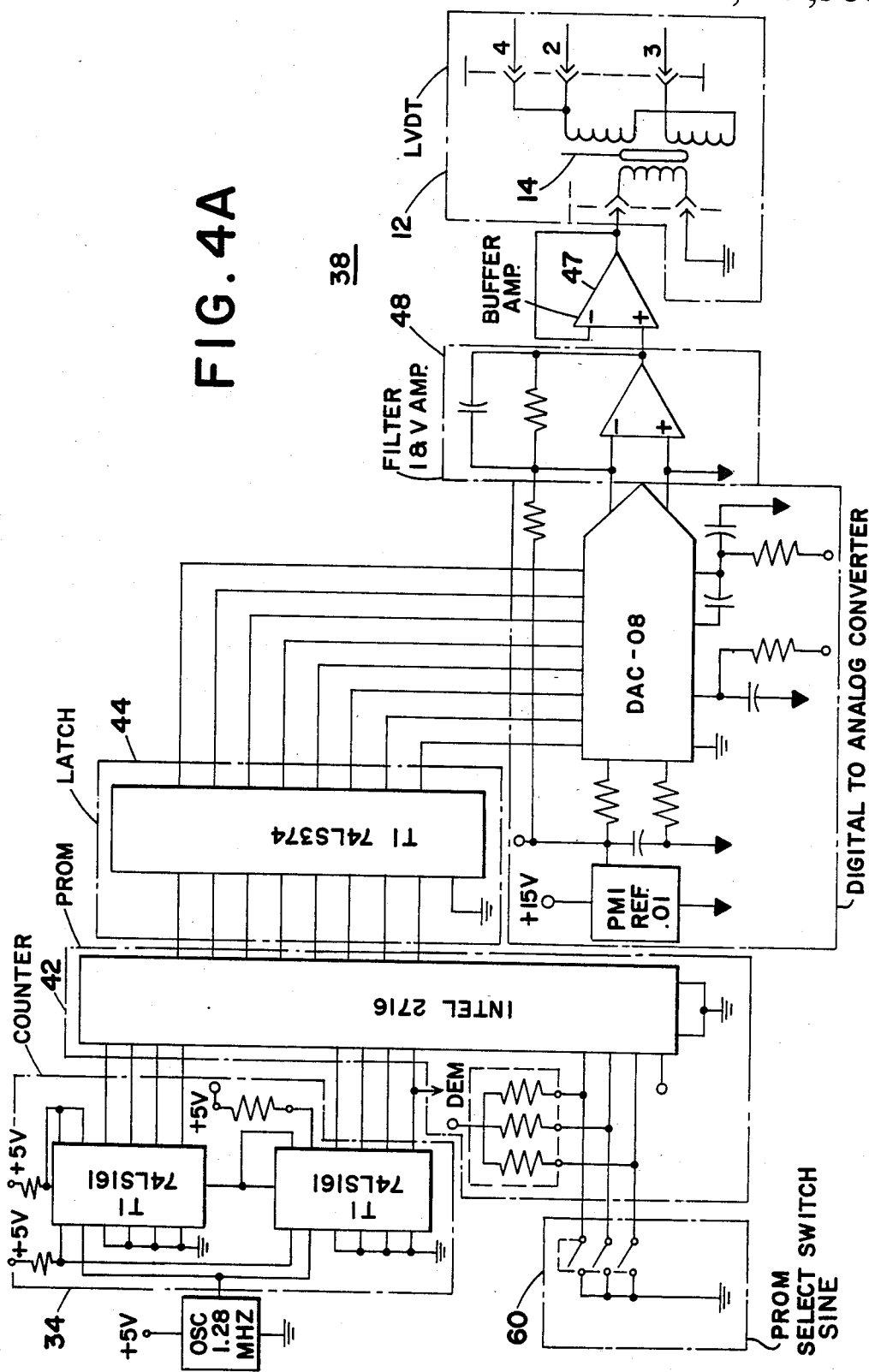
FIGS. 4A and 4B are circuit schematics showing in more detail the disclosed transducer conditioning circuit, using a stabilized phase demodulator.
Figure 4B:
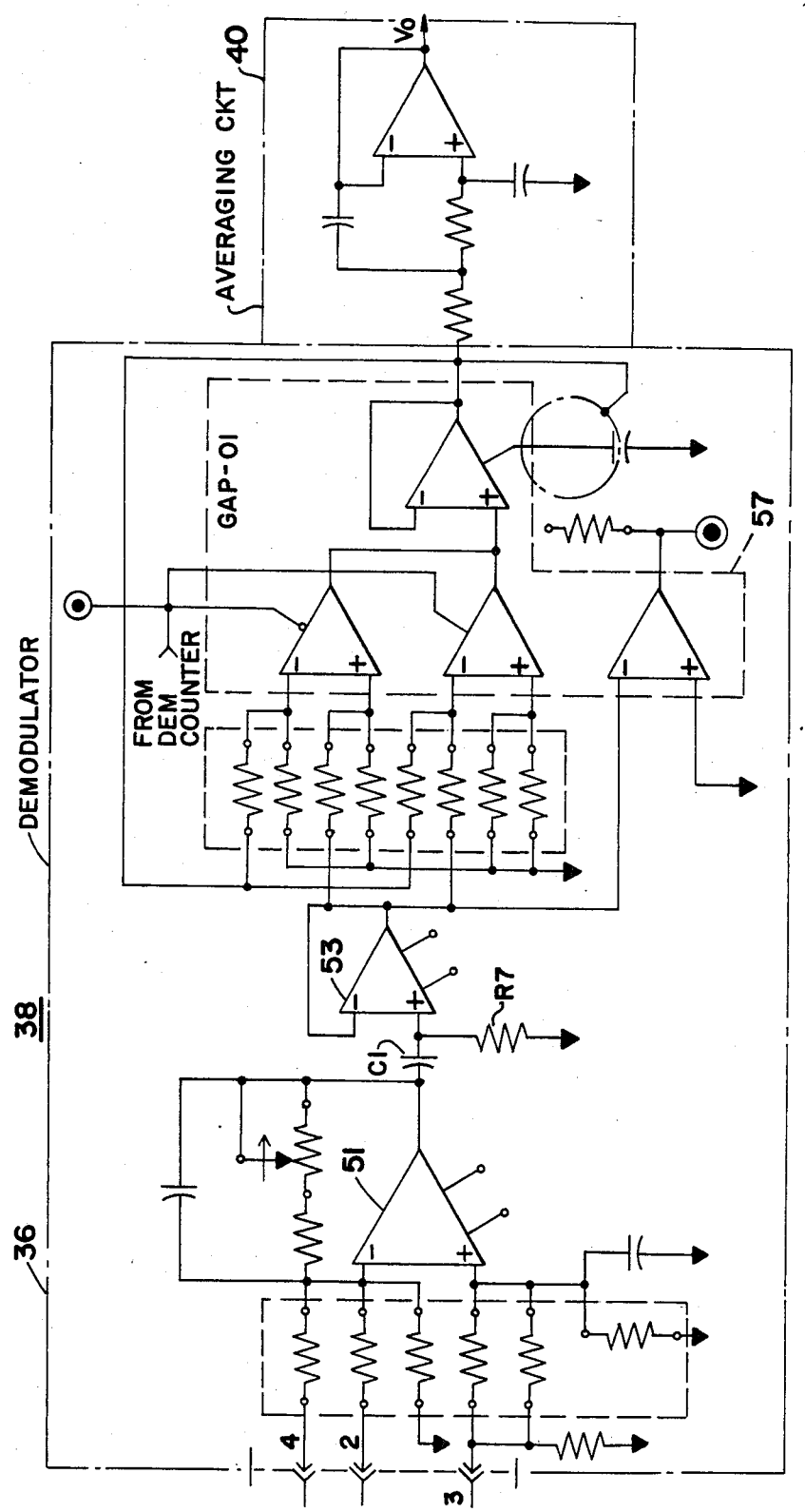

Referring now to FIGS. 4A and 4B there is shown in detail a transducer conditioning and synchronized demodulator circuit 38 constructed according to the present inventions. To generate the primary drive signal an EPROM 42 is used to store a 256 byte sine function which is changed by a specified phase angle, amplitude and/or frequency with respect to the demodulator drive signal. For the circuit shown in FIG. 4A an Intel 2716 EPROM, with a 2K byte storage, is used. A 3 bit switch 60 has been provided to decode the three most significant address bits of the PROM 42 thereby permitting the storage of eight different sinusoidal wave forms. The output of a microprocessor rather than switch 60 could be used if desired to select one of the waveforms.

It has been determined that a phase difference of two degrees between the secondary inphase component and the demodulator will cause less than 0.2% attenuation of the inphase signal and allow an offset error of less than 5% of the magnitude of the quadrature signal, which is an acceptable performance level for the disclosed application. The sine PROM 42 has eight 256 byte sinusoidal wave forms stored at four degree intervals. Thus by proper set up of the switches in selection switch 60, a wave form may be selected around zero degree phase shift for a particular LVDT 12, between negative 16 degrees and positive 16 degrees which will be no greater than two degrees from the ideal phase shift.

The output of the sine PROM 42 is latched into a latch 44 to deglitch the output lines of PROM 42. The latched sine byte is then inputed to a multiplying DAC 46. The signal at the output of amplifier 48 is plus or minus 5 volts at 5 KHz. Amplifier 48 is compensated for a bandwidth of 50 KHz to eliminate the noise which is generated by the 1.28 MHz update rate of the sine PROM 42 output to the DAC. Buffer amplifier 49 is used to buffer the primary excitation signal to the primary winding of the LVDT 12.

The secondary output of the LVDT 12 is input to a variable gain amplifier 51 in synchronized demodulator 36 shown in FIG. 4B. Amplifier 51 is designed to have a balanced differential input with a nominal overall gain of 17. For certain LVDTs, it is necessary to double the gain of amplifier 51. To accomplish this doubling of gain the input registors to the negative input of amplifier 51 are connected in parallel.

The input amplifier 51 is compensated so that the bandwidth is 45 KHz at the nominal gain of 17 to 1. This compensation allows the 5 KHz secondary output carrier to pass through unattenuated but attenuates the higher frequency signal components of the input signal.

The output of amplifier 51 is then passed through a 500 Hz high pass filter, formed by capacitor C1 and resistor R7, to eliminate DC coupling of the amplifier 51 with the following circuitry and also to provide attenuation of 50 Hz or 60 Hz noise which may have been induced on the input signal. Buffer amplifier 53 provides a high impedance for the high pass filter and a low impedance input to the demodulator.

A Precision Monolithics Incorporated, PMI, GAP-01 chip 57 is used as the full wave phase sensitive demodulator where the demodulator information signal is derived from LVDT 12 and the demodulator drive signal is the most significant bit from counter 34. The signal at the output of demodulator 36 consists of a full wave rectified 5 KHz signal which has an average value which is proportional to the LVDT 12 core displacement. To extract the average and eliminate the 5 KHz rectified carrier frequency, the demodulator output is passed through the 500 Hz low pass active filter 40. For the system on which this circuit is presently utilized the highest frequency of interest is 50 Hz, and therefore the 500 Hz low pass filter allows the 50 Hz data to pass relatively unattenuated.

Figure 5:
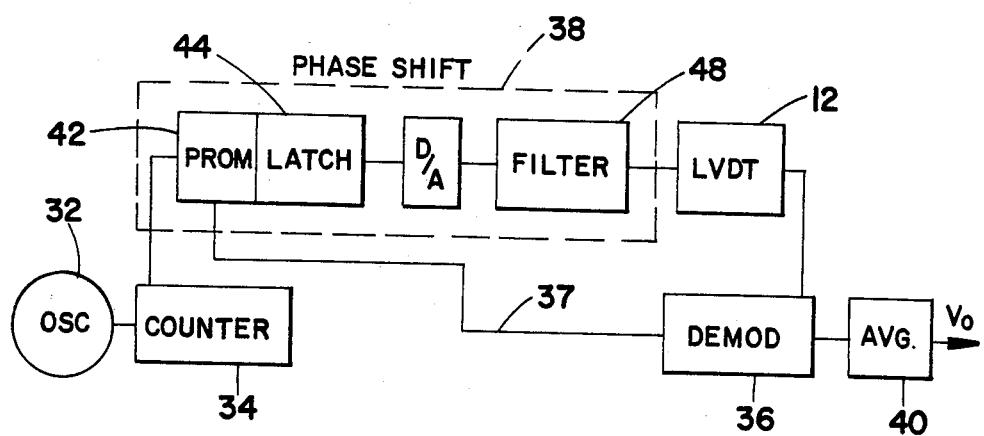
FIG. 5 is a block diagram of an embodiment wherein the demodulator drive signal is from the PROM; and, FIG. 6 is a block diagram of an embodiment which does not use a digital to analog converter.

Referring now to FIG. 5 there is shown an embodiment where the PROM 42 feeds the control signal to demodulator 36. In this embodiment an output of PROM 42 is fed along line 37 to a control input on demodulator 36.

The disclosed conditioning and stablized phase demodulator circuit 38 produces a constant phase shift. The phase shift, amplitude and frequency are readily alterable with different programming of the PROM 42. Use of the PROM 42 and the DAC 46 gives stable amplitude for the primary excitation signal to LVDT 12. Use of the PROM 42 and DAC 46 gives low harmonic distortion. The harmonic distortion can be further improved or reduced by using more or less bits for the counter 34, PROM 42 and DAC 46 or by providing additional filtering at the output of the DAC 46.

We claim:

1. A signal conditioning circuit having a transducer, with a mechanical input for sensing movement and an electrical input which is excited by a carrier frequency signal to provide a modulated output signal indicative of the mechanical movement sensed, and a demodulator connected to the output of the transducer for demodulating the transducer's output signal, characterized by:
   a relatively high frequency oscillator;
   a counter connected to the oscillator and providing a lower frequency signal for driving the demodulator;
   a programmable memory having preprogrammed data stored therein and addressed by output signals from said counter, said memory having a first output connected with said demodulator and providing a first digital output of a processed sine wave defining a reference signal having a first selected phase, and having a second output providing a second digital output of a processed sine wave having a second selected phase; and,
   a digital to analog converter connected with the second output of said memory for converting the second digital sine wave output from said memory to an analog sine wave output which is connected to provide the excitation signal to said transducer.

2. A signal conditioning circuit as claimed in claim 1 characterized by:
   a filter connected between the output of said digital to analog converter and the input to said transducer for smoothing the sine wave excitation signal.

3. A signal conditioning circuit as claimed in claim 1 characterized by:
   said memory having sufficient capacity to store a plurality of processed sine waves; and,
   selecting means connected to said memory means for selecting the sine wave which is to be outputted from said memory means in response to address signals from said counter.

4. A signal conditioning circuit as claimed in claim 3 characterized by:
   latch means connected to the output of said memory means for receiving and latching said second digital output.

5. A signal conditioning circuit as claimed in claim 4 characterized by:
   said transducer is a linear variable differential tansformer; and,
   an averaging circuit connected to the transformer; of said demodulator for removing unwanted higher frequency components from the demodulator output signal.

6. A stabilized phase sensitive demodulator circuit comprising:
   a high frequency oscillator;
   counter means for receiving and dividing the output signal from said oscillator;
   programmable memory means having at least two sets of sine functions, which are phase shifted by predetermined angles, stored therein and responsive to address bits from the counter for providing first and second digital outputs respectively of said stored sine functions;
   a digital to analog converter responsive to the first output of said programmable memory means for providing an analog output of the sine function;
   a transducer having a primary winding, connected to receive the output signal from said analog to digital converter, and a mechanical input, for sensing movement, providing a modulated output signal representative of the mechanical input movement; and
   demodulator means connected to receive the modulated output signal from said transducer and the second output from said memory means for providing an output signal representative of the mechanical input to said transducer.

7. A stabilized phase sensitive demodulator circuit as claimed in claim 6 comprising:
   and averaging circuit provided at the output of said demodulator for removing unwanted AC components from the demodulator output signal.

8. A stabilized phase sensitive demodulator circuit as claimed in claim 6 comprising:
   a filter connected between the output of said digital to analog converter and the input to said transducer for smoothing the signal.

9. A stabilized phase sensitive demodulator circuit as claimed in claim 6 comprising:
   a latch provided at the output of said programmable memory for receiving and latching said first digital output; and,
   a filter provided between the output of said digital to analog converter and the input to said transducer.

10. A signal conditioning circuit for extracting a signal from an excited transducer comprising:
    an oscillator;
    counter means for receiving an input from said oscillator and providing a lower frequency output;
    a programmable memory having programmed data stored therein and addressed by the output of said counter means for providing a first digital representation sine output defining a reference signal having a first selected phase, and for providing a second digital representation sine output having a second selected phase which is different in phase than said first selected phase by an amount determined by the programmed data stored in said memory;
    a transducer having a mechanical input, connected to sense movement, and a primary winding, for providing a modulated signal output which is a function of the mechanical movement sensed;
    a digital to analog converter responsive to the second digital sine output from said memory for providing an analog output excitation signal which is delivered to said primary winding; and,
    a demodulator connected to receive the modulated output signal from said transducer and operable in response to said reference signal to provide phase sensitive demodulation.

11. A signal conditioning circuit as claimed in claim 10 comprising:

averaging means connected at the output of said demodulator to provide a DC signal which is proportional to the mechanical movement sensed by said transducer.

12. A signal conditioning circuit as claimed in claim 10 comprising:

a latch provided at the output of said memory for receiving and latching said second digital representation sine output signal; and, a filter provided between the output of said digital to analog converter and the input to said transducer.

13. A signal conditioning circuit as claimed in claim 10 wherein said transducer is a linear variable displacement transformer.

* * * * *